United States Patent
Karstens et al.

(10) Patent No.: US 7,994,931 B2
(45) Date of Patent: Aug. 9, 2011

(54) GRAPHICAL WIND GAUGE

(75) Inventors: Nathan L. Karstens, Overland Park, KS (US); Brian K. Feller, Olathe, KS (US); Jon Josephson, Vancouver, WA (US)

(73) Assignee: Garmin Switzerland GmbH (CH)

( * ) Notice: Subject to any disclaimer, the term of this patent is extended or adjusted under 35 U.S.C. 154(b) by 341 days.

(21) Appl. No.: 12/392,763

(22) Filed: Feb. 25, 2009

(65) Prior Publication Data

US 2010/0026688 A1    Feb. 4, 2010

Related U.S. Application Data

(60) Provisional application No. 61/085,474, filed on Aug. 1, 2008.

(51) Int. Cl.
*G08B 5/00* (2006.01)
(52) U.S. Cl. ........... 340/815.4; 340/851; 340/984; 340/987
(58) Field of Classification Search ........ 114/39.11; 701/21; 340/851, 945, 946, 984, 985, 987
See application file for complete search history.

(56) References Cited

U.S. PATENT DOCUMENTS

| | | | | |
|---|---|---|---|---|
| 4,836,019 A | * | 6/1989 | Hagen et al. | 73/180 |
| 5,117,687 A | * | 6/1992 | Gerardi | 73/170.15 |
| 6,308,649 B1 | * | 10/2001 | Gedeon | 114/39.11 |
| 6,370,949 B1 | * | 4/2002 | Zysko et al. | 73/170.15 |
| 6,402,090 B1 | * | 6/2002 | Aaron | 244/24 |
| 2010/0121506 A1 | * | 5/2010 | Cazzaro et al. | 701/21 |
| 2010/0301607 A1 | * | 12/2010 | Morimoto | 290/44 |

OTHER PUBLICATIONS

Garmin GPSMAP®4000/5000 Series Owner's Manual, May 2007.
Micronet tacktick® mn100 Analogue Display, published prior to Feb. 25, 2009.
Nexus Wind Data Instrument, Installation and Operation Manual English, Mar. 2007.
Raymarine ST40 Wind Instrument Owner's Handbook, 2001.
Raymarine ST70+ User Reference Manual, Jan. 2009.
Raymarine printout from ST290 Analog Wind Display, http://www.raymarine.com/ProductDetail.aspx?SITE=1&SECTION=2&PAGE=494&PRODUCT=1059, published prior to Feb. 25, 2009.
Raymarine printout from ST290 Analog Wind Display, http://www.raymarine.com/ProductDetail.aspx?SITE=1&SECTION=2&PAGE=494&PRODUCT=1060, published prior to Feb. 25, 2009.
Silva 4000 Wind Instrument Directions for Use, published prior to 1999.

\* cited by examiner

*Primary Examiner* — Daryl Pope
(74) *Attorney, Agent, or Firm* — Samuel M. Korte

(57) ABSTRACT

A wind gauge display apparatus comprising a control device and a reconfigurable display for displaying a first visual representation of a wind gauge if a wind angle is within a first range and displaying a second visual representation of the wind gauge if the wind angle is within a second range. The angles displayed on the reconfigurable display may be determined by input from a user. On the reconfigurable display, a location of a visual indicator of wind speed may be different in the first visual representation of the wind gauge than in the second visual representation of the wind gauge. The wind gauge display apparatus may also comprise a sensor for determining wind angle and wind speed.

24 Claims, 5 Drawing Sheets

GRAPHICAL WIND GAUGE

RELATED APPLICATION

This Application, under the provisions of 35 U.SC. §119 (e), claims the benefit of priority to U.S. Provisional Application Ser. No. 61/085,474, filed Aug. 1, 2008, entitled "GRAPHICAL CLOSE HAULED WIND GAUGE" the disclosure of which is incorporated herein by reference in its entirety.

BACKGROUND

1. Field of the Invention

Embodiments of the present invention relate to wind gauges. More particularly, embodiments of the present invention relate to graphical gauges for displaying wind angles and wind speed.

2. Description of the Related Art

Wind gauges are useful in the operation of sailing or wind-powered vessels, because the speed of such a vessel largely depends on the angle it makes with the wind. A wind gauge receives input from a wind angle and speed sensor and displays this data to the user. Conventional wind gauges display a 360-degree view to the user, with angles referenced as 0 degrees to 180 degrees port or starboard from the bow of the vessel.

A close hauled wind gauge differs in that it displays a zoomed-in view of the 360-degree scale, typically magnifying a range of 20 degrees to 60 degrees off the bow and stern. This type of gauge is useful for when the vessel's destination is directly into the wind. As a sailboat cannot move directly into the wind, it must sail in a zigzag pattern, forming a shallow angle with the wind. In order to achieve the maximum possible speed in such a maneuver, it is important that the boat maintains a certain wind angle. Each boat has an ideal wind angle, which varies depending on the design of the sails and the shape of the hull. The close hauled wind gauge provides a more precise view of the wind angle so that the helmsman may sail at or near the ideal wind angle.

The indicator needle of a close hauled wind gauge behaves differently than the indicator needle on a regular wind gauge because only a select range of angles are magnified. So, for example, wind angles 20-60 degrees port and starboard off the bow and 20-60 degrees port and starboard off the stern may be magnified on the close hauled scale, but the remaining angles are compressed or do not have their angles displayed at all.

To achieve the desired magnification, the close hauled wind gauge is often designed to only display 180 degrees against the wind (0-90 degrees port and starboard). Therefore, if a wind angle sensor is pointed at 0 degrees and moved in a complete circle clockwise, the close hauled wind gauge would display the following angles:

| Angle | Behavior of indicator needle |
| --- | --- |
| 0 | centered at top of the gauge |
| 0-60 | moves clockwise to a maximum scale value on the right |
| 60-120 | holds at the maximum scale value on the right |
| 120-180 | moves counterclockwise to the top of the gauge |
| 180-240 | moves counterclockwise to a maximum scale value on the left |
| 240-300 | holds at the maximum scale value on the left |
| 300-360 | moves clockwise to the top of the gauge |

This indicator needle behavior makes it difficult to tell if the vessel is heading upwind or downwind simply by looking at the wind gauge. For example, the indicator needle may be in the same position for 0 degrees as it is for 180 degrees wind angle. Furthermore, the indicator needle may be in the same position for 40 degrees as it is for 140 degrees. Additionally, various vessels may have differing ideal wind angle values, therefore making a close hauled wind gauge with a typical display of 20-60 degrees impractical for use on some vessels.

SUMMARY

Embodiments of the present invention relate to displaying wind angles and wind speeds. More particularly, embodiments of the invention provide an apparatus and method for displaying different visual indicia depending on a received wind angle. One exemplary embodiment of the apparatus may comprise a control device and a reconfigurable display for displaying a first visual representation of a wind gauge if a wind angle is within a first range and displaying a second visual representation of the wind gauge if the wind angle is within a second range. The angles displayed on the reconfigurable display may be determined by input from a user. On the reconfigurable display, a location of a visual indicator of wind speed may be different in the first visual representation of the wind gauge than in the second visual representation of the wind gauge.

The apparatus may also comprise or be coupled to a sensor for determining or measuring wind angle and wind speed. The first and second visual representations of the wind angle gauge may include a visual indicator of the wind speed. The visual indicator may be positioned at a first location on the reconfigurable display when the wind angle is within the first range and may be positioned at a second location on the reconfigurable display when the wind angle is within the second range.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
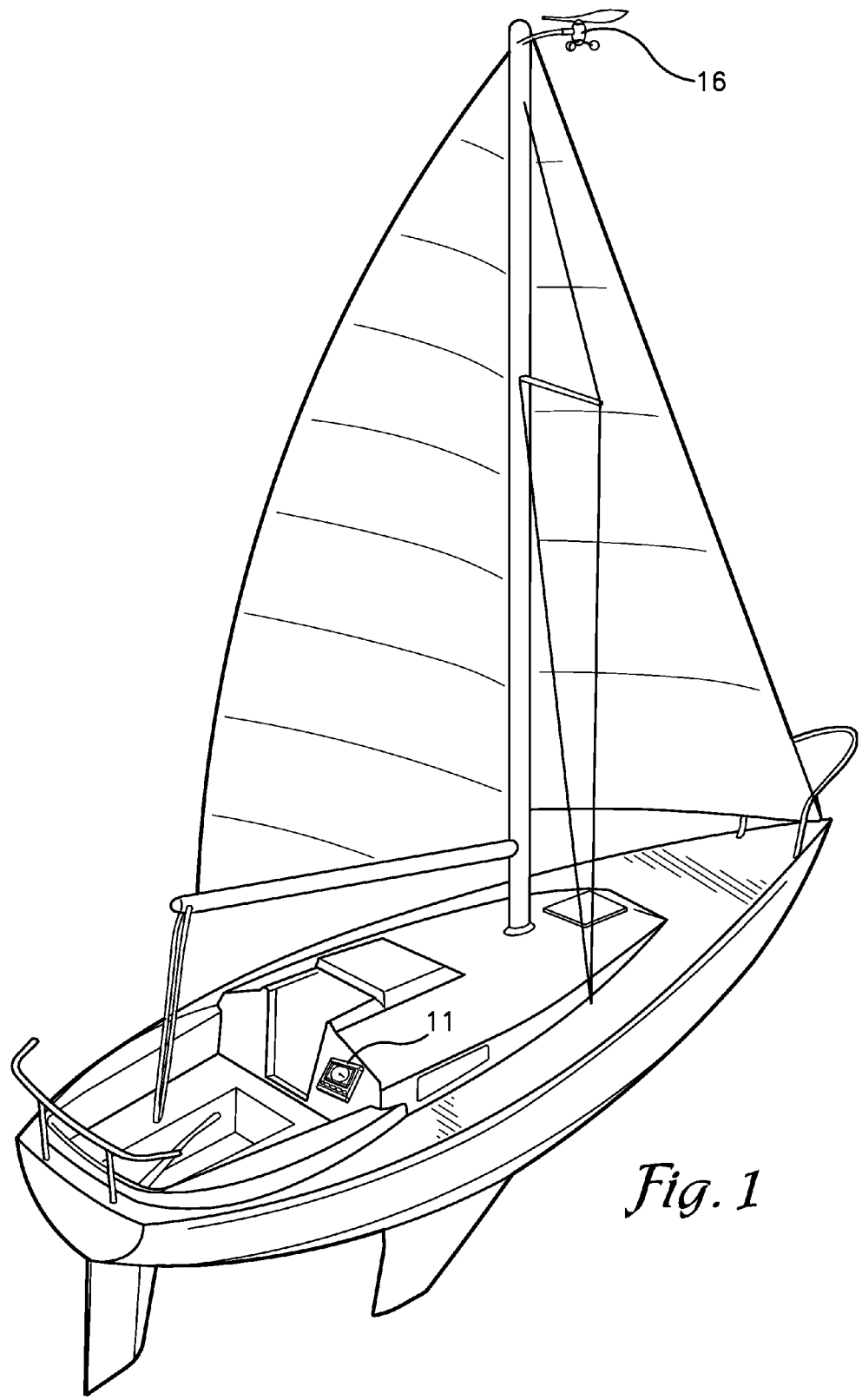
FIG. 1 is an environmental view of an apparatus constructed in accordance with various embodiments of the present invention, the apparatus shown installed in a sailboat and coupled with a wind sensor.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

The functions and methods of embodiments of the present invention may be accomplished with hardware, software, firmware, mechanical components, or a combination thereof. For example, embodiments of the invention may be implemented with an apparatus broadly referred to by the numeral 10 in FIG. 2. The apparatus 10 and methods described and illustrated herein are merely examples that may be used to implement embodiments of the present invention and may be replaced with other apparatuses and methods without departing from the scope of the invention.

Figure 2:
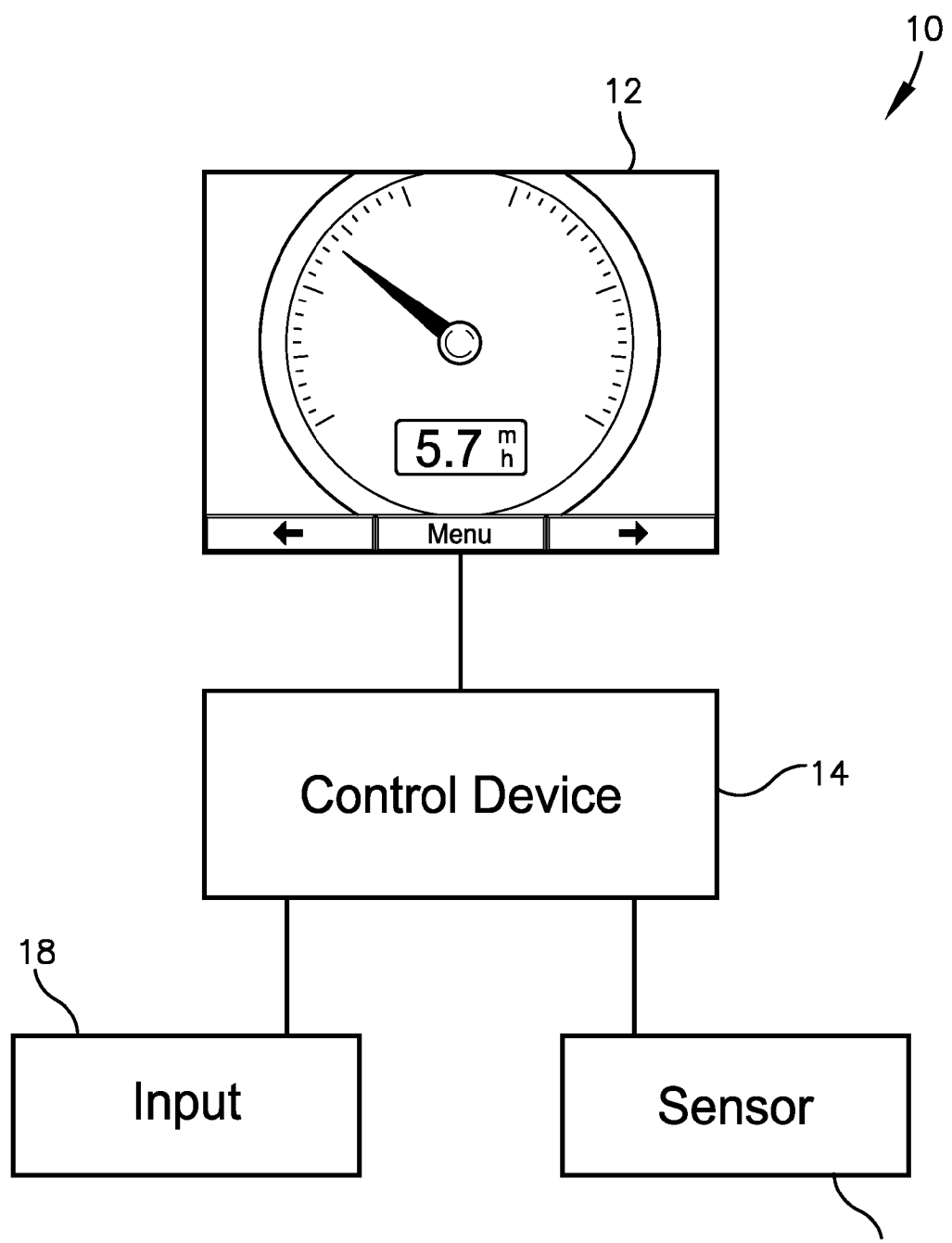
FIG. 2 is a schematic view of an apparatus constructed in accordance with embodiments of the present invention for displaying wind angle and wind speed.

The apparatus 10 of FIGS. 1-2 provides various visual representations of a wind gauge and may comprise a reconfigurable display 12 and a control device 14. The control device 14 may be coupled to or further comprise a sensor 16 for determining wind angle and/or wind speed and an input 18 for receiving wind angle ranges and thresholds. In various embodiments, as illustrated in FIG. 1, the apparatus 10 is associated with a marine vessel, such as a sailboat, to present information to the vessel's pilot. The apparatus 10, and/or portions of the apparatus 10, may form an integral part of the marine vessel or the apparatus 10, and/or portions of the apparatus 10, may be coupled with or otherwise attached to the vessel for use by the vessel's pilot.

The reconfigurable display 12 may be coupled with the control device 14 and may be operable to display various information corresponding to wind speed and wind angle. The reconfigurable display 12 may comprise black and white, monochrome, or color display elements including CRT, TFT, LCD, OLED, and/or plasma display devices. In various embodiments of the apparatus 10, the reconfigurable display 12 may be a touch-screen display to enable the user to interact with it by touching or pointing at display areas to provide information to the control device 14.

The control device 14 may include one or more processors, controlling devices, microcontrollers, programmable logic devices, application specific integrated circuits, or other computing devices and memory so that it may determine which visual representations to display on the reconfigurable display 12. Further, the control device 14 and the reconfigurable display 12 may be integral and/or communicably coupled such that the reconfigurable display may be operable to specifically perform the various functions described herein. Thus, the control device 14 and the reconfigurable display 12 can be combined or be separate or otherwise discrete elements. Further, as discussed below, the control device 14 may be configured to present information beyond specifying the views used by the reconfigurable display 12. For example, in some embodiments, the control device 14 may provide various instrumentation, navigation, communication, and chart plotting functionality.

The sensor 16 may comprise any element of combination of elements operable to sense wind-related information for use by the apparatus 10. For example, the sensor 16 may be operable to sense apparent wind speed, apparent wind angle, true wind speed, true wind angle, wind velocity made good (VMG), combinations thereof, and the like.

In some embodiments, the sensor 16 may include a wind vane for detection of wind angle and an anemometer to register wind speed. The sensor 16 may also be operable to capture barometric pressure and air temperature data. The sensor 16 may provide NMEA 2000 connectivity, or other wired and/or wireless marine network connectivity, to easily couple with other electronic components associated with the marine vessel, including the input 18, reconfigurable display 12, control device 14.

Additionally or alternatively, the sensor 16 may be operable to provide information in addition to, or as an alternative to, wind-related information. For example, the sensor 16 may include engine sensors for sensing engine characteristics (battery voltage, fuel flow rate, oil pressure, RPM, etc.) of the marine vessel, fuel sensors for sensing fuel characteristics (fuel flow rate, fuel level, cruising range, etc.) of the marine vessel, navigation sensors for providing navigation information (waypoint location, speed, position, map information, route information, other location information, etc.) for the marine vessel, weather sensors for sensing weather information (barometric pressure, air temperature, etc.), and/or water sensors for sensing water information (depth, temperature, etc.). The sensor 16, and the various sensor components that may comprise the sensor 16, may be removably coupled to the control device 14 using NMEA 2000 connections, or other wired or wireless electrical connections, to allow the control device 14 to be provided with a variety of sensed information. However, in some embodiments, the sensor 16 may be integral with portions of the apparatus 10, such as the control device.

The input 18 is provided for receiving various data signals and may include any number of processors, controlling devices, integrated circuits, programmable logic devices, or other computing devices and resident or external memory (not shown) for storing data and other information accessed and/or generated by the input 18, sensor 16, and/or the reconfigurable display 12. The memory may include, for example, removable and non-removable memory elements such as RAM, ROM, flash, magnetic, optical, USB memory devices, and/or other conventional memory elements.

The input 18 may permit a user to operate the apparatus 10 and may enable users, third parties, or other devices to share information with the apparatus 10. The input 18 may comprise one or more functionable inputs such as buttons, switches, scroll wheels, a touch screen associated with the reconfigurable display 12, voice recognition elements such as a microphone, pointing devices such as mice, touchpads, tracking balls, styluses, a remote control, a camera such as a digital or film still or video camera, combinations thereof, etc.

Further, the input 18 may comprise wired or wireless data transfer elements such as a removable memory, data transceivers, etc., to enable the user and other devices or parties to remotely interface with the apparatus 10. Alternatively, the input 18 may include a flash memory card slot for receiving removable flash memory cards and a USB port for coupling with a USB cable connected to another computing device such as a personal computer, marine multi-function display, and/or marine network controller. The input 18 may allow the user or an external device to specify the angles to display on the reconfigurable display, as described below. In this way, the reconfigurable display can focus on values ideal for a particular vessel.

In some embodiments, the apparatus 10 may comprise a multi-function marine instrument device operable to display various marine-related information on the reconfigurable display 12. For example, the apparatus 10 may include a housing 11 to house the display 12, control device 14, and input 18. The sensor 16 may be external to the housing 11 and/or couple with the housing 11 using an electrical connection, such as a NMEA 2000 or NMEA 0183 connection. The housing 11 may also be coupled with GPS receiver/antennas and any of the other various sensors discussed above. However, in some embodiments, the sensor 16 may be integral with the housing 11.

In some embodiments, the apparatus 10 is operable to couple with, or comprise a portion of, a marine chart plotter. For example, the housing 11 may be coupled with the marine chart plotter using an electrical connection, such as a NMEA 2000 or NMEA 0183 connection, or the apparatus 10 itself may function as a marine chart plotter or other marine electronic instrument. Utilization of a marine network to couple the control device 14 with the sensor 16 and/or display 12 enables each of the components to be conveniently located at various suitable locations around the marine vessel.

A computer program of the present invention may be stored in or on a computer-usable medium, such as a computer-readable medium, residing on or accessible by the control device 14 to implement the method of the present invention as described herein. The computer program may comprise an ordered listing of executable instructions for implementing logical functions in the control device 14 and other computing devices coupled with the control device 14. The computer program can be embodied in any computer-usable medium for use by or in connection with an instruction execution system, apparatus, or device, such as a computer-based system, processor-containing system, or other system that can fetch the instructions from the instruction execution system, apparatus, or device, and execute the instructions.

The ordered listing of executable instructions comprising the computer program of the present invention will hereinafter be referred to simply as "the program" or "the computer program." It will be understood by those skilled in the art that the program may comprise a single list of executable instructions or two or more separate lists, and may be stored on a single computer-usable medium or multiple distinct media. The program will also be described as comprising various "code segments," which may include one or more lists, or portions of lists, of executable instructions. Code segments may include overlapping lists of executable instructions, that is, a first code segment may include instruction lists A and B, and a second code segment may include instruction lists B and C.

In the context of this document, a "computer-usable medium" can be any means that can contain, store, communicate, propagate or transport the program for use by or in connection with the instruction execution system, apparatus, or device. The computer-usable medium can be, for example, but is not limited to, an electronic, magnetic, optical, electromagnetic, infrared, or semi-conductor system, apparatus, device, or propagation medium. More specific, although not inclusive, examples of computer-usable media would include the following: an electrical connection having one or more wires, a portable computer diskette, a random access memory (RAM), a read-only memory (ROM), an erasable, programmable, read-only memory (EPROM or Flash memory), and a portable compact disk read-only memory (CDROM).

Figure 3:
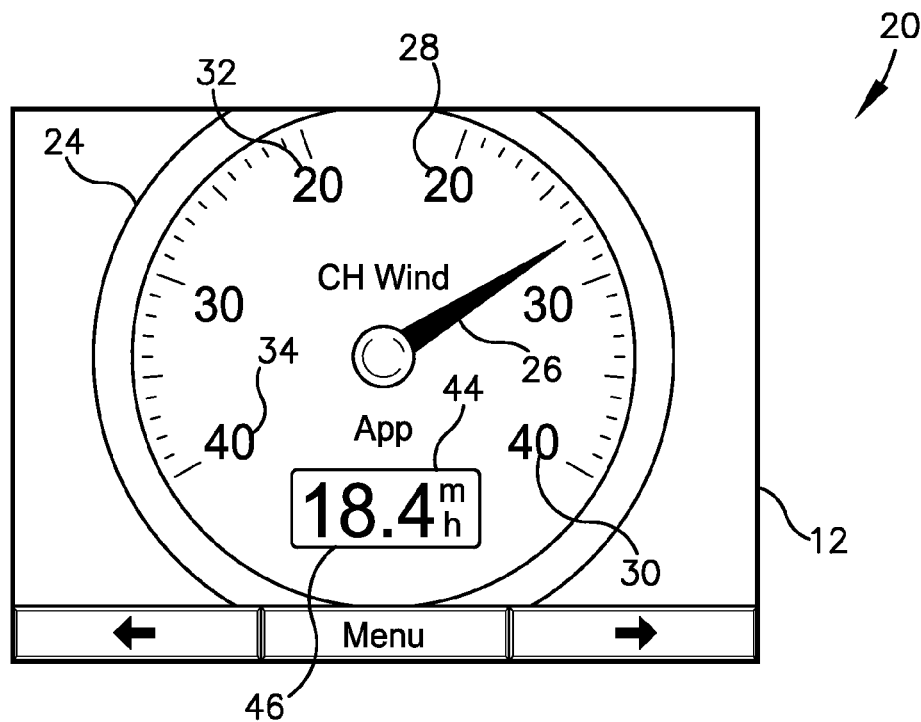
FIG. 3 is a screen shot of a reconfigurable display of the apparatus of FIG. 2 displaying a first visual representation of a wind angle gauge.

In use, the reconfigurable display 12 may display at least one of a plurality of visual representations of a wind gauge, such as a close hauled wind gauge, a running wind gauge, or any other wind gauge known in the art. As illustrated in FIGS. 2 and 3, both a first visual representation 20 of the wind gauge and a second visual representation 22 of the wind gauge may depict a circular gauge 24 with an indicator needle 26 rotatably affixed in a center of the circular gauge 24 for indicating the wind angle received by the sensor 16. The circular gauge 24 may display one or more ranges of angles, such as one range of angles on a right side of the circular gauge 24 and one range of angles on a left side of the circular gauge 24. These ranges may be different for each of the first and second visual representations 20, 22 of the wind gauge, and may be modified depending on user inputs, as described herein.

The first visual representation 20 of the wind gauge may display a first minimum angle value on the right 28 and a first maximum angle value on the right 30, as well as values therebetween. The first visual representation 20 of the wind gauge may also display a first minimum angle value on the left 32 and a first maximum angle value on the left 34, as well as angle values therebetween. The second visual representation 22 of the wind gauge may display a second minimum angle value on the right 36 and a second maximum angle value on the right 38, as well as values therebetween. The second visual representation 22 of the wind gauge may also display a second minimum angle value on the left 40 and a second maximum angle value on the left 42, as well as angle values therebetween. For example, with direct wind being equal to 0 degrees, the first visual representation 20 of the wind gauge may illustrate relative angles from 20 degrees to 40 degrees left and right of direct wind (as in FIG. 3), while the second visual representation of the wind gauge may illustrate relative angles from 140 to 170 degrees left and right of direct wind (as in FIG. 4).

Furthermore, the first visual representation 20 may depict a visual indicator 44 of the wind speed at a first location 46 on the reconfigurable display 12, while the second visual representation 22 may depict the visual indicator 44 of the wind speed at a second location 48 on the reconfigurable display 12. The visual indicator 44 of the wind speed may be a numerical display of the wind speed, a graphical display, a meter display, or any other visual display known in the art for communicating wind speed to a user.

In various embodiments of the invention, the position or location of the visual indicator 44 of the wind speed may be associated with whether the sensor 16 is facing substantially upwind or substantially downwind. In one example, the first location 46 for the visual indicator 44 of the wind speed may be at or proximate a bottom portion of the reconfigurable display 12, and the second location 48 for the visual indicator 44 of the wind speed may be at or proximate a top portion of the reconfigurable display 12. However, the visual indicator 44 of the wind speed may be located anywhere on the reconfigurable display 12 or may be omitted entirely from the reconfigurable display without departing from the scope of this invention.

In various embodiments of the invention, the control device 14 may command the reconfigurable display 12 to display the first visual representation 20 of the wind angle gauge if the wind angle is within a first range, and to display the second visual representation of the wind angle gauge if the wind angle is within a second range. In some embodiments, the control device 14 may automatically transition between the representations 20, 22 or the transitions may be manually controlled by a user of the apparatus 10.

The control device 14 may store or receive a first threshold value and a second threshold value. If the wind angle surpasses the first threshold value, the control device 14 may command the reconfigurable display 12 to switch from displaying the first visual representation 20 of the wind gauge to displaying the second visual representation 22 of the wind gauge. Likewise, if the wind angle surpasses the second threshold value, or again passes the first threshold in the opposite direction, the control device 14 may command the reconfigurable display 12 to switch from displaying the second visual representation 22 of the wind gauge to displaying the first visual representation 20 of the wind gauge. Such functionality enables the apparatus 10 to automatically toggle between the most suitable gauges.

In an exemplary embodiment of the apparatus 10 illustrated in FIGS. 3-4, if the sensor 16 is placed at a wind angle of 0 degrees and turned clockwise by 360 degrees, the reconfigurable display 12 would exhibit the behavior described in Table 1, below.

TABLE 1

| Wind angles (degrees) | Visual representation | Relative behavior of indicator needle |
|---|---|---|
| 0 | First | Centered at top of wind gauge |
| 0-40 | First | Moves clockwise to first maximum angle value on right (40 degrees absolute) |
| 40-140 | First | Holds at first maximum angle value on right |
| 140-180 | Second | Moves clockwise from first threshold value (140 degrees absolute) to bottom of wind gauge |
| 180-220 | Second | Moves clockwise to second minimum angle (220 degrees absolute) value on left |
| 220-320 | Second | Holds at second minimum angle value on left |
| 320-360 | First | Moves clockwise from second threshold value (320 degrees absolute) to top of wind gauge |

In an exemplary embodiment of the apparatus 10, if the sensor 16 is placed at a wind angle of 0 degrees and turned counter-clockwise by 360 degrees, the reconfigurable display 12 would exhibit the behavior described in Table 2, below.

TABLE 2

| Wind angles (degrees) | Visual representation | Relative behavior of indicator needle |
|---|---|---|
| 360 | First | Centered at top of wind gauge |
| 360-320 | First | Moves counter-clockwise to first maximum angle value (320 degrees absolute) on left |
| 320-220 | First | Holds at first maximum angle value on left |
| 220-180 | Second | Moves counter-clockwise from first threshold value (220 degrees absolute) to bottom of wind gauge |
| 180-140 | Second | Moves counter-clockwise to second minimum angle value on right (140 degrees absolute) |
| 140-40 | Second | Holds at second minimum angle value on right |
| 40-0 | First | Moves counter-clockwise from second threshold value (40 degrees absolute) to top of wind gauge |

The wind angles utilized above are absolute angles (0-360 degrees). However, as illustrated in the figures, the wind angles presented on the display 12 may be relative angles (e.g., 0-180 degrees port and starboard), where 0 degrees is oriented at the top of the display 12. So in the examples of Tables 1-2, the reconfigurable display 12 may automatically switch from the first visual representation 20 to the second visual representation 22, and vice versa, at the various angles indicated in the Tables.

As should be appreciated, embodiments of the present invention may employ any threshold values to switch between the representations 20, 22. Further, embodiments of the present invention may provide more than two visual representations. For example, the reconfigurable display 12 may present the first visual representation 20 for a first set of wind angles, the second visual representation 22 for a second set of wind angles, a third visual representation for a third set of wind angles, and so on. Some of the wind angle sets may be overlapping and, under such circumstances, the reconfigurable display 22 may automatically toggle between any number of the appropriate representations for the current wind angle. Further, as discussed above, the wind angles and thresholds may be user configurable using the input 18, such that the reconfigurable display 12 transitions between the various representations based on the wind angle ranges and/or thresholds defined by the user.

Figure 4:
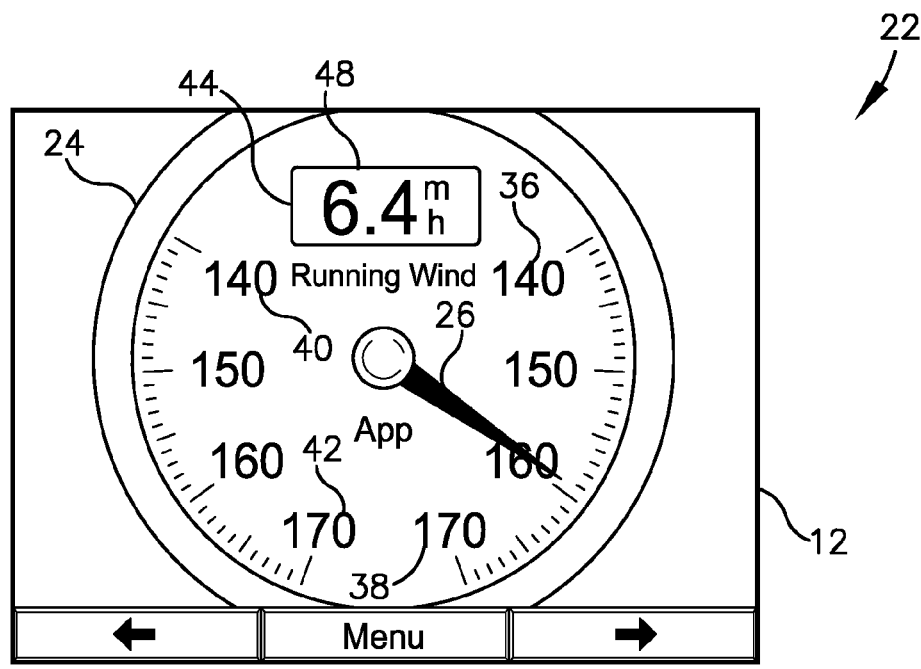
FIG. 4 is a screen shot of the reconfigurable display of FIG. 2 displaying a second visual representation of the wind angle gauge.
Figure 6:
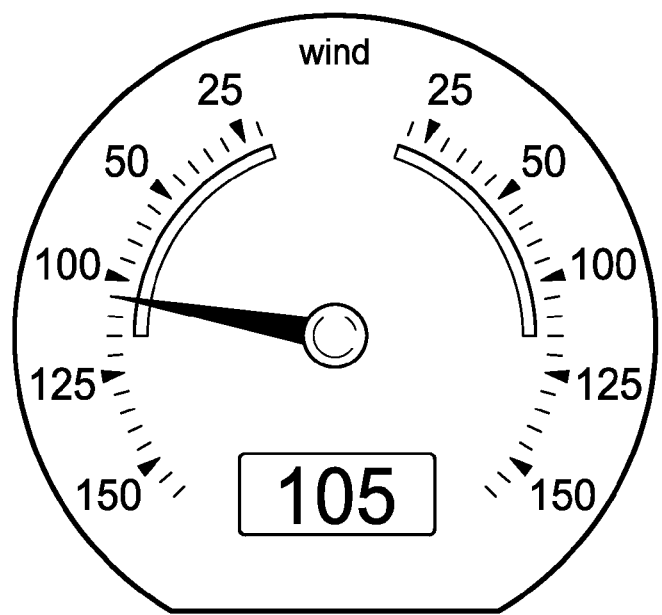
FIG. 6 is a screen shot of a reconfigurable display of the apparatus of FIG. 2 displaying a third visual representation of a wind angle gauge.
Figure 7:
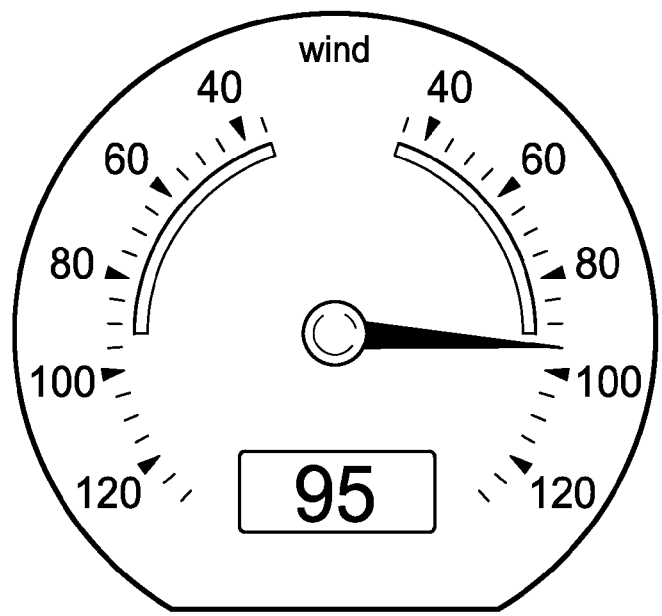
FIG. 7 is a screen shot of a reconfigurable display of the apparatus of FIG. 2 displaying a fourth visual representation of a wind angle gauge.

Further, embodiments of the present invention are not limited to displaying the close haul and running wind gauges illustrated in FIGS. 3-4 and the reconfigurable display 12 can present wind gauges of any format. For example, as shown in FIGS. 6-7, embodiments of the present invention may present wind gauges having any format based on various wind angle ranges and thresholds specified by the user using the input 18. Specifically, FIG. 6 illustrates an exemplary wind gauge providing wind angle readings between 20 and 160 degrees and FIG. 7 illustrated an exemplary wind gauge providing wind angle readings between 35 and 130 degrees. The configurability provided by various embodiments of the present invention enables visual representations having any wind angle scale to be presented on the display 12.

In some embodiments, the control device 14 may rely on the orientation of the sensor 16 in determining how to orient the visual representations 20, 22 presented on the display 12. For example, the control device 14 may assume that the sensor 16 is properly oriented toward the bow of the vessel to identify an accurate 0 degree position. However, in other embodiments, the user of the control device 14 may provide inputs to calibrate the control device 14, display 12, and/or sensor 16 even after the sensor 16 is installed in or on the marine vessel. For example, if the sensor 16 is incorrectly installed such that it does not provide a proper 0 degree angle measurement, the user may calibrate any portion of the apparatus 10 to provide a proper 0 degree angle measurement relative to the bow of the marine vessel.

Figure 5:
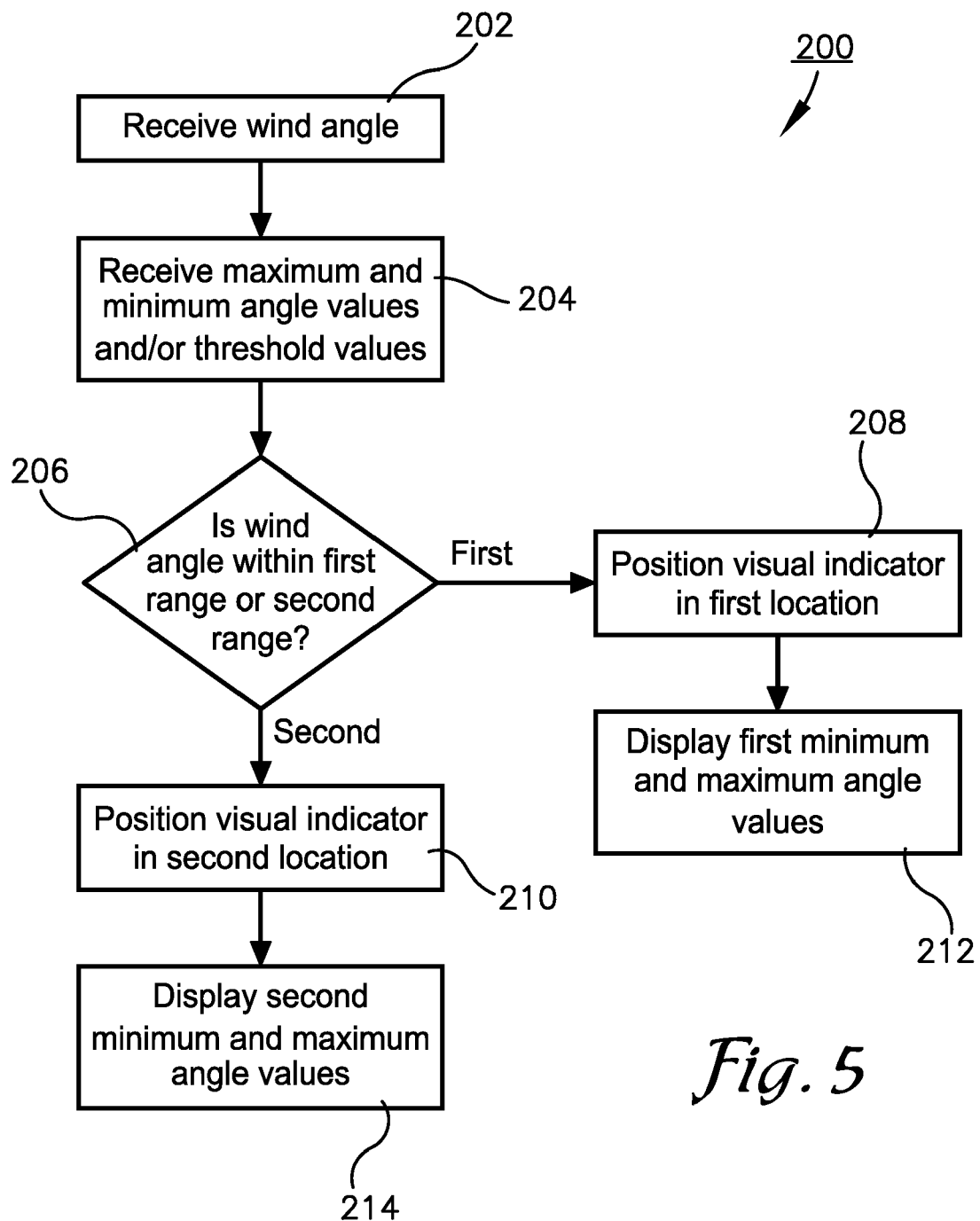
FIG. 5 is a flow chart depicting an embodiment of a method for displaying wind angle and wind speed on the apparatus of FIG. 2.

The flow chart of FIG. 5 shows the functionality and operation of one embodiment of the present invention in more detail. In this regard, some of the blocks of the flow charts may represent a module segment or portion of code of a program of the present invention which comprises one or more executable instructions for implementing the specified logical function or functions. In some alternative implementations, the functions noted in the various blocks may occur out of the order depicted. For example, two blocks shown in succession may in fact be executed substantially concurrently, or the blocks may sometimes be executed in reverse order depending upon the functionality involved.

Specifically, FIG. 5 illustrates an exemplary embodiment of a method 200 for displaying wind angles and wind speeds on the reconfigurable display 12. The first step may comprise receiving data representing the wind angle, as depicted in step 202. As depicted in step 204, the method may also comprise receiving any of: the first minimum and maximum angle values on the right; the first minimum and maximum angle values on the left; the second minimum and maximum angle values on the right; the second minimum and maximum angle values on the left; and the first and second threshold values.

In step 206, the method determines if the wind angle is within the first range or the second range. Then, the method may comprise displaying the visual indicator in the first location if the wind angle is within the first range, as in step 208 or else displaying the visual indicator in the second location if the wind angle is within the second range, as depicted in step 210.

In step 212, the method displays the first minimum and maximum angle values on the right 28, 30 and angle values therebetween, as well as displaying the first minimum and maximum angle values on the left 32, 34 and angle values therebetween when the wind angle is within the first range. In various embodiments of the invention, a first set of indicia representing a first set of angles may be displayed if the wind angle is within the first range. The first maximum angle values 30, 34 and the first minimum angle values 28, 32 may define boundaries of the first set of angles. For example, the first set of angles may be 20-40 degrees to the right of zero degrees and 20-40 degrees to the left of zero degrees, with 20 being the first minimum angle value 28,32 and 40 being the first maximum angle value 30,34.

Step 214 depicts displaying the second minimum and maximum angle values on the right 36, 38 and angle values therebetween as well as displaying the second minimum and maximum angle values on the left 40, 42 and angle values therebetween when the wind angle is within the second range. In various embodiments of the invention, a second set of indicia representing a second set of angles may be displayed if the wind angle is within the second range. The second maximum angle values 38, 42 and the second minimum angle values 36, 40 may define boundaries of the second set of angles. For example, the second set of angles may be 140-170 degrees to the right of zero and 140-170 degrees to the left of zero, with 140 being the second minimum angle value 36, 40 and 170 being the second maximum angle value 38, 42.

Although the invention has been described with reference to the embodiments illustrated in the attached drawing figures, it is noted that equivalents may be employed and substitutions made herein without departing from the scope of the invention as recited in the claims. For example, while two distinct visual representations 20,22 of the wind gauge are described and illustrated herein, more visual representations of the wind gauge may be displayed on the reconfigurable display 12 based on user input, external input, or wind speed and/or angle without departing from the scope of the invention.

Having thus described various embodiments of the invention, what is claimed as new and desired to be protected by Letters Patent includes the following:

1. A wind gauge display apparatus comprising:
   a reconfigurable display operable to display at least two distinct visual representations of a wind angle gauge; and
   a control device integral to or communicably coupled with the reconfigurable display and configured to command the reconfigurable display to display a first visual representation of the wind angle gauge if a wind angle is within a first range and to display a second visual representation of the wind angle gauge if the wind angle is within a second range.

2. The wind gauge display apparatus of claim 1, further comprising a sensor configured to determine the wind angle.

3. The wind gauge display apparatus of claim 1, further comprising a sensor configured to determine the wind speed.

4. The wind gauge display apparatus of claim 1, wherein the visual representations of the wind angle gauge include a visual indicator of the wind speed, such that the visual indicator is positioned at a first location on the reconfigurable display when the wind angle is within the first range of angles and the visual indicator is positioned at a second location on the reconfigurable display when the wind angle is within the second range of angles.

5. The wind gauge display apparatus of claim 1, wherein the first representation of the wind angle gauge is a visual representation of a close hauled wind angle gauge.

6. The wind gauge display apparatus of claim 1, further comprising an input for inputting at least one of a desired range of angles to be displayed on the reconfigurable display and at least one threshold value to the control device.

7. The wind gauge display apparatus of claim 5, wherein the at least one threshold value indicates to the control device at what wind angle or wind angles to change the reconfigurable display either from the first visual representation to the second visual representation or from the second visual representation to the first visual representation.

8. The wind gauge display apparatus of claim 1, wherein the reconfigurable display displays a visual representation of a meter needle directed to a top center point within the first visual representation of the wind angle gauge when the wind angle is zero degrees.

9. The wind gauge display apparatus of claim 1, wherein the reconfigurable display displays a visual representation of a meter needle moving clockwise toward a visual representation of a first maximum angle value within the first visual representation of the wind angle gauge when the wind angle increases from zero degrees to an angle anywhere between zero degrees and the first maximum angle value.

10. The wind gauge display apparatus of claim 1, wherein the reconfigurable display displays a visual representation of a meter needle held at a visual representation of a first maximum angle value within the first visual representation of the wind angle gauge when the wind angle is equal to the first maximum angle value or between the first maximum angle value and a first threshold angle value.

11. The wind gauge display apparatus of claim 1, wherein the reconfigurable display displays a visual representation of a meter needle moving clockwise toward a bottom center location within the second visual representation of the wind angle gauge as the wind angle changes from the first threshold angle to an angle anywhere between the first threshold angle and 180 degrees.

12. The wind gauge display apparatus of claim 1, wherein the reconfigurable display displays a visual representation of a meter needle moving clockwise toward a visual representation of a second minimum angle value within the second visual representation of the wind angle gauge as the relative wind angle is decreased from 180 degrees to an angle anywhere between 180 degrees and the second minimum angle value.

13. The wind gauge display apparatus of claim 1, wherein the reconfigurable display displays a visual representation of a meter needle held at the visual representation of a second minimum angle value within the second visual representation of the wind angle gauge when the wind angle is equal to the second minimum angle value or between the second minimum angle value and a second threshold angle.

14. The wind gauge display apparatus of claim 1, wherein the reconfigurable display displays a visual representation of a meter needle moving clockwise toward the top center location within the first visual representation of the wind angle gauge when the relative wind angle is decreased from a second threshold angle to anywhere between the second threshold angle and 0 degrees.

15. A wind gauge display apparatus for displaying at least one of wind angle and wind speed, the wind gauge display apparatus comprising:
   a reconfigurable display operable to display at least two distinct visual representations of a wind angle gauge;
   a control device integral to or communicably coupled with the reconfigurable display and configured to command the reconfigurable display to display a first visual representation of the wind angle gauge if a wind angle is within a first range and to display a second visual representation of the wind angle gauge if the wind angle is within a second range; and
   an input configured for receiving at least one set of ranges to be displayed on the reconfigurable display.

16. The wind gauge display apparatus of claim 15, further comprising a sensor configured to determine at least one of the wind angle and the wind speed.

17. The wind gauge display apparatus of claim 15, wherein the visual representations of the wind angle gauge include a visual indicator of the wind speed, such that the visual indicator is positioned at a first location on the reconfigurable display when the wind angle is within the first range of angles and the visual indicator is positioned at a second location on the reconfigurable display when the wind angle is within the second range of angles.

18. The wind gauge display apparatus of claim 17, wherein the control device changes the reconfigurable display either from the first visual representation to the second visual representation or from the second visual representation to the first visual representation when the wind angle reaches or passes by at least one threshold wind angle value.

19. The wind gauge display apparatus of claim 15, wherein the first representation of the wind angle gauge is a visual representation of a close hauled wind angle gauge.

20. The wind gauge display apparatus of claim 15, wherein the reconfigurable display displays a visual representation of a meter needle:
   directed toward a top center location within the first visual representation of the wind angle gauge when the wind angle is zero degrees;
   moved clockwise toward a visual representation of a first maximum angle value within the first visual representation of the wind angle gauge when the wind angle increases from zero degrees to an angle anywhere between zero degrees and the first maximum angle value;
   held at the visual representation of the first maximum angle value within the first visual representation of the wind angle gauge when the wind angle is equal to the first maximum angle value or between the first maximum angle value and a first threshold angle value;
   moved clockwise toward a bottom center location within the second visual representation of the wind angle gauge as the wind angle changes from the first threshold angle to an angle anywhere between the first threshold angle and 180 degrees;
   moved clockwise toward a visual representation of a second minimum angle value within the second visual representation of the wind angle gauge as the relative wind angle is decreased from 180 degrees to an angle anywhere between 180 degrees and the second minimum angle value;
   held at the visual representation of the second minimum angle value within the second visual representation of the wind angle gauge when the wind angle is equal to the second minimum angle value or between the second minimum angle value and a second threshold angle; and
   moved clockwise toward the top center location within the first visual representation of the wind angle gauge when the relative wind angle is decreased from the second threshold angle to anywhere between the second threshold angle and 0 degrees.

21. A method for displaying wind angles and wind speeds on a reconfigurable display, the method comprising:
   receiving data representative of a wind angle at a control device;
   determining with the control device if the wind angle is within a first range or a second range;
   displaying on a display a first set of indicia representing a first set of angles if the wind angle is within a first range; and
   displaying on the display a second set of indicia representing a second set of angles if the wind angle is within a second range.

22. The method of claim 21, further comprising receiving at least one of a maximum angle and a minimum angle at the control device, wherein the maximum angle and the minimum angle define boundaries of the first set of angles and the second set of angles.

23. The method of claim 21, further comprising displaying a visual indicator of the wind speed at a first location on the display when the wind angle is within the first range, and displaying the visual indicator of the wind speed at a second location on the display when the wind angle is within the second range.

24. The method of claim 21, wherein the first set of indicia includes a visual representation of a close hauled wind angle gauge.

* * * * *